No. 896,957.  
PATENTED AUG. 25, 1908.  
W. V. TURNER.  
FLUID PRESSURE BRAKE.  
APPLICATION FILED DEC. 7, 1904.
2 SHEETS—SHEET 1.
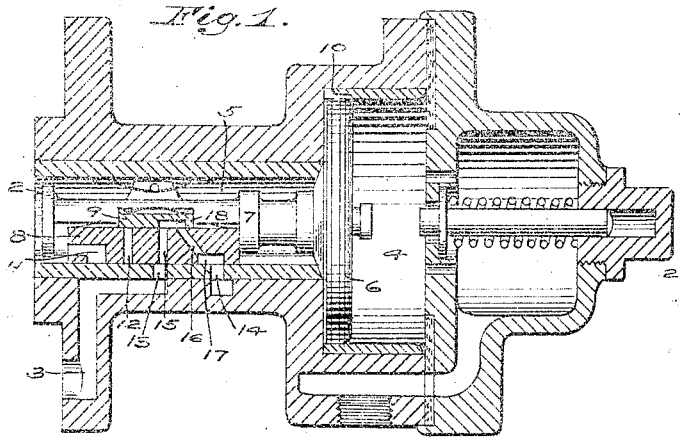
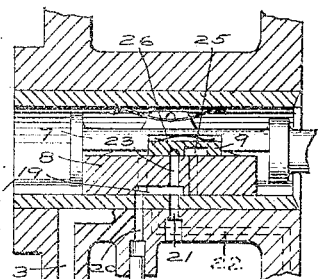
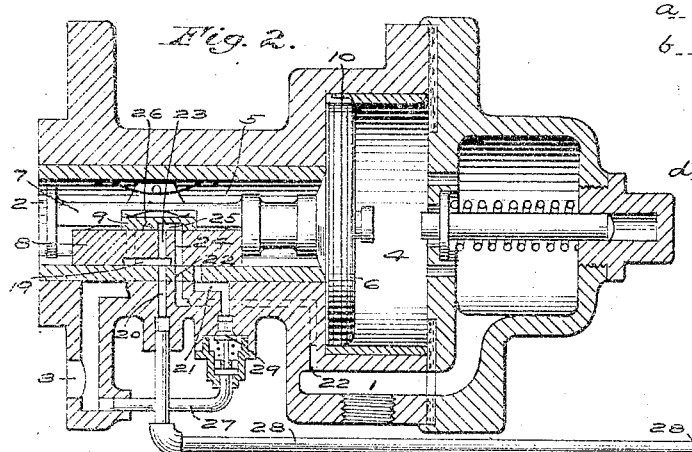
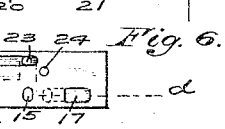
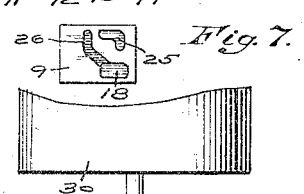
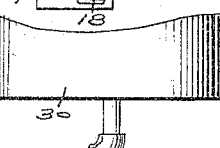
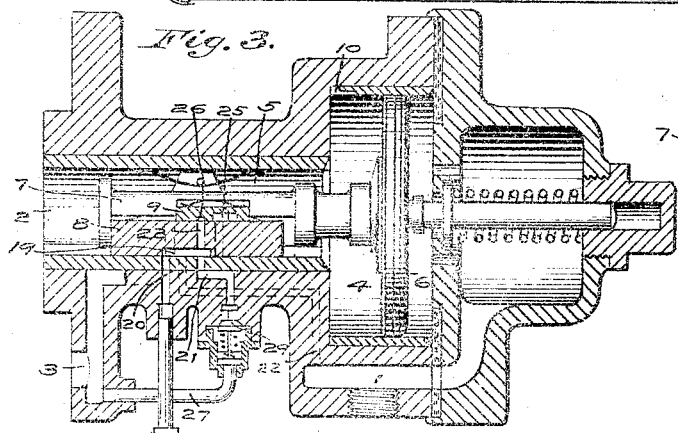
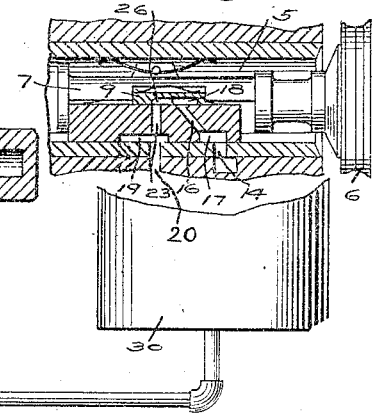
WITNESSES  
INVENTOR  
Walter V. Turner  
by E. Wright  
Att'y.

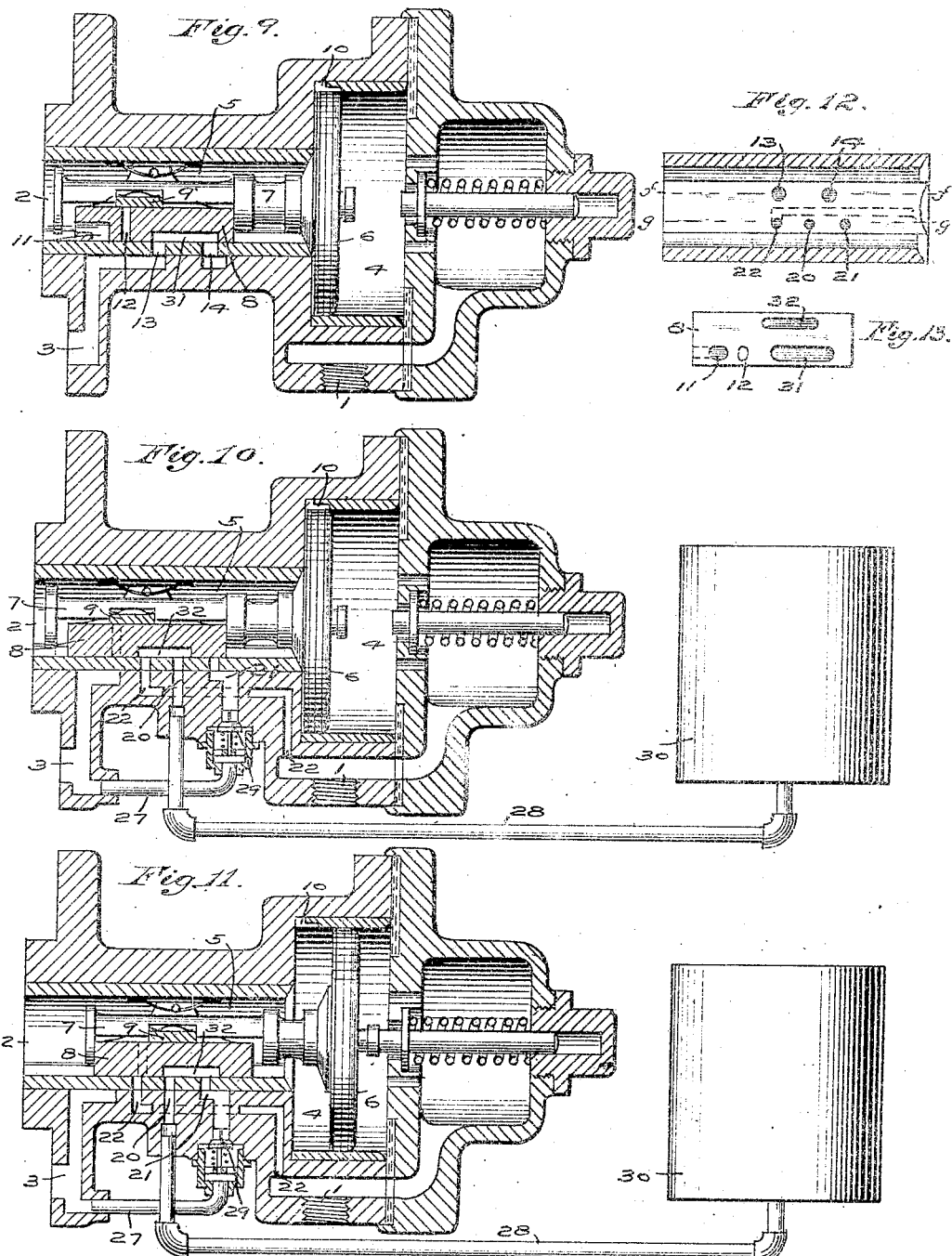

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 896,957.   Specification of Letters Patent.   Patented Aug. 25, 1908.

Application filed December 7, 1904. Serial No. 235,822.

*To all whom it may concern:*

Be it known that I, WALTER V. TURNER, a citizen of the United States, residing in Wilkinsburg, in the county of Allegheny and State of Pennsylvania, have invented a certain new and useful Improvement in Fluid-Pressure Brakes, of which the following is a specification.

This invention relates to automatic fluid pressure brakes such as usually operated by compressed air, and has for one of its objects to provide for a more perfect control of the brake cylinder pressure whereby the same may be reduced by graduated amounts or entirely released, as desired.

With the present standard automatic air brake apparatus, as is well known, the brake cylinder pressure may be increased in graduated amounts by making successive reductions in train pipe pressure, but cannot be graded down in a similar manner, since there is no provision for controlling the brake cylinder exhaust other than the movement of the triple valve to release position under an increase in train pipe pressure, at which time the brake cylinder is entirely released to the atmosphere.

It is often desirable to be able to reduce the pressure in the brake cylinder a given amount without entirely releasing the same, or to grade the pressure down at will, and, in order to secure this result, one feature of my invention comprises improved means for momentarily venting air from the train pipe, or causing a slight reduction upon the train pipe side of the triple valve piston, at the time that the same is moved for releasing the brake and thereby cause the valve to close the brake cylinder exhaust. According to the preferred construction, I propose to employ a small additional reservoir, or chamber, with means for opening communication from the train pipe to said chamber, and operating upon an increase in train pipe pressure, or at the time the triple valve moves to release the brake.

Another feature of my invention relates to means for securing a more rapid rise in brake cylinder pressure at the commencement of an ordinary service application. With the present standard equipment the rise in brake cylinder pressure during the first part of the service application is very slow, owing to the fact that it is first necessary to fill the brake cylinder, or the volume displaced by the movement of the brake piston, from zero up to a pressure of 15 lbs. per square inch before any actual pressure is exerted upon the brake shoes, and it will thus be seen that a large amount of compressed air is required to move out the brake piston and raise this volume to atmospheric pressure before there is any perceptible rise in brake cylinder pressure. According to the second feature of my invention, I propose to overcome this defect by providing additional means, such as a small reservoir, normally charged with air under pressure, for supplying the brake cylinder at the beginning of a service application, and operated by a reduction of pressure in the train pipe or upon the movement of the triple valve to apply the brake. While the same additional reservoir may be utilized both for securing the graduated release of the brake and also for effecting a quick initial rise in brake cylinder pressure, it will be obvious that separate reservoirs may be employed, if desired, and that either one of the features of my invention may be used without the other.

In the accompanying drawings, Figure 1 is a sectional view of a triple valve device embodying my improvements, the section being taken on the line *a—a* of Fig. 5; Fig. 2 a similar sectional view taken substantially on the broken line *b—c—b* of Fig. 5, and showing the connections to the additional or supplemental reservoir; Fig. 3 a sectional view similar to Fig. 2, but taken substantially on the straight line *b—b* of Fig. 5, and showing the parts in service application position; Fig. 4 a sectional view taken substantially on the broken line *d—d* of Fig. 6, and showing the parts in position for graduating the release; Fig. 5 a plan view of the main slide valve seat; Fig. 6 a face view of the main slide valve; Fig. 7 a face view of the graduating slide valve; Fig. 8 a sectional view similar to Fig. 3, but showing a slight modification; Fig. 9 a section of a modified form of triple valve device taken on the line *f—f* of Fig. 12; Fig. 10 a similar sectional view taken on the line *g—g* of Fig. 12, and showing the connection with the additional reservoir; Fig. 11 a sectional view similar to Fig. 10, but showing the parts in service application position; Fig. 12 a plan view of the main slide valve seat; and Fig. 13 a face view of the main slide valve.

According to the preferred form of the invention, as shown on Sheet 1 of the drawings the device comprises the usual form of triple valve casing having train pipe connection 1, auxiliary reservoir connection 2, and brake cylinder connection 3, the casing containing the usual piston chamber 4, valve chamber 5, feed groove 10, piston 6, with stem 7, main slide valve 8, and graduating slide valve 9. In the main slide valve seat are located the usual brake cylinder port 13 and exhaust port 14, while the main slide valve 8 is provided with emergency port 11 and service port 12 controlled by the graduating valve 9, all of which may be of the ordinary standard construction, which is well understood by all familiar with the art.

In addition to the above mentioned ports I provide in the valve seat a port 22 leading to the train pipe, port 20 communicating by pipe 28 with a small additional or supplemental reservoir 30, and port 21 communicating through check valve 29 and pipe 27 with the brake cylinder.

The main slide valve is provided with additional ports as follows; port 23 communicating with cavity 19, which is adapted to register with the additional reservoir port 20 in the valve seat in both the full release and the service application positions of the main slide valve; port 23 connecting with the train pipe port 22 in release position; ports 15 and 16, the latter communicating with cavity 17 and the exhaust port 14 in full release position. In the graduating slide valve is located the cavity 25 for establishing communication between the ports 23 and 24 of the main slide valve in full release position, and the cavity 18 for connecting the exhaust ports 15 and 16; this latter cavity may also be provided with an extension 26 for connecting the supplemental reservoir port with the exhaust when graduating the release of the brake cylinder pressure.

When the system is to be charged, air, or other fluid, under pressure is turned into the train pipe and, moving the parts of the valve device to full release position, as shown in Figs. 1 and 2, flows through the feed groove 10 and charges the auxiliary reservoir to the normal standard degree of pressure in the usual way. Fluid under pressure also flows through the train line port 22, port 24, cavity 25, and ports 23, 20 and pipe 28 to the additional reservoir 30 charging the same to the normal standard pressure carried in the train line.

When a gradual reduction in train pipe pressure is made for a service application of the brakes, the triple piston 6 with the graduating slide valve 9 moves relatively to the main slide valve until the head of the stem 7 engages with the main valve 8. During this movement the graduating valve has opened the upper end of the service port 12, and cut off communication between the exhaust ports 15 and 16 of the main slide valve, and has also cut off communication between the ports 23 and 24. The piston continues to move back under the predominating pressure of the auxiliary reservoir, and carries the main slide valve with it to service position, as indicated in Figs. 3 and 8. In this position the service port 12 registers with the brake cylinder port 13 while the exhaust port 14 is closed, and cavity 19 connects ports 20 and 21, whereby communication is established between the additional or supplemental reservoir and the brake cylinder through check valve 29 and pipe 27.

It will be observed that as the main slide valve moves to its service application position, the cavity 19 is arranged to connect with the port 21 in advance of the opening of the service port 12 to the brake cylinder port 13, so that the air under pressure stored in the additional reservoir 30 is given an opportunity to expand into the brake cylinder and substantially equalize therewith before any considerable amount of air is admitted from the auxiliary reservoir. As the air then flows from the auxiliary reservoir into the brake cylinder the check valve 29 closes and prevents any return flow to the additional reservoir. The triple piston and graduating slide valve then move to lap position in the usual way as the auxiliary reservoir pressure falls to a point slightly below that of the train pipe, thereby closing the service port 12. Further and successive reductions in train pipe pressure may be made for causing further action of the graduating valve for increasing the brake cylinder pressure in the usual way. In the meantime, the pressure in the supplemental reservoir 30 remains at the reduced amount at which it equalized into the brake cylinder at the initial movement of the triple valve, or, if the port 21 is open to the atmosphere instead of the brake cylinder, as shown in Fig. 8, the pressure in reservoir 30 will of course be only atmospheric pressure.

When it is desired to reduce the brake cylinder pressure, or to graduate the release, a small increase is made in train pipe pressure sufficient to move the triple valves to release position, and the brake valve is then turned back to lap. As the triple valve moves to release position, see Figs. 1 and 2, the brake cylinder exhaust is opened to the atmosphere through ports 13, 15, 18, 16 and 14, while at the same time the train pipe is put into communication with the supplemental reservoir through ports 22, 24, 25, 23, 20 and pipe 28. Air from the train pipe then vents to the supplemental reservoir which is at a much lower pressure, and the reduction produced thereby upon the train pipe side of the triple valve piston causes the movement of the piston and graduating slide valve to the position indicated in Fig. 4, which may be termed the graduated release position. In this position the exhaust from the brake cylinder through the port 15 of the main slide valve is closed, as is also communication from the train pipe through ports 22 and 24, so that the brakes are held applied at a reduced pressure corresponding to the amount of air released from the brake cylinder during the time that the exhaust port was open. The venting of air from the train pipe into the supplemental reservoir raises the pressure therein a certain amount before the port 24 is closed and, if desired, this pressure may be released to the atmosphere in the graduated release position of the valve by means of the extension 26 of the exhaust cavity 18 in the graduating slide valve, which extension connects with port 23 of the main slide valve and exhausts the air from reservoir 30 through ports 16 and 14, as clearly shown in Fig. 4. Further reductions in the brake cylinder pressure may be made by increasing the train pipe pressure in successive stages, each rise in train pipe pressure causing the triple piston and graduating valve to move to full release position for momentarily opening the brake cylinder exhaust, and train pipe vent to the supplemental reservoir, whereupon the reduction in train pipe pressure produced by expansion into the supplemental reservoir causes the piston and graduating valve to move back to graduated release position, as above described. By this means the brake cylinder pressure may be graded down to any point desired, or may be entirely released at any time by merely making a continuous increase in train pipe pressure which operates to hold the triple valve in full release position and to charge the supplemental reservoir to the same degree of pressure as that of the train pipe.

It is not necessary that the air be released from the supplemental reservoir at each graduation in reducing the brake cylinder pressure since, if the supplemental reservoir is made of medium capacity, several graduations may be made by the venting of the train pipe into said reservoir before the pressure therein will be raised to substantially equal the train pipe pressure. When, however, the supplemental reservoir is to be used only for the function of graduating the release, it is preferable to employ the feature of releasing the air from the supplemental reservoir at each graduation, since in this way a very small reservoir may be used and finer graduations in the reduction of the brake cylinder pressure may be secured.

When a sudden reduction in train pipe pressure is made for an emergency application, the triple piston and valve move to the extreme position, in which the graduating spring is compressed and air from the auxiliary reservoir flows to the brake cylinder through ports 11 and 13 in the usual way.

According to the modification shown on Sheet 2 of the drawings, the supplemental reservoir is used more especially for securing a rapid initial rise in brake cylinder pressure and the main slide valve is provided with the usual exhaust cavity 31 for connecting the brake cylinder port 13 and exhaust port 14, and a cavity 32 for connecting the train pipe, vent port 22 with the supplemental reservoir port 20 in release position, and adapted also, in service application position, to connect the supplemental reservoir port with the port 21 leading to the brake cylinder. The supplemental reservoir is charged with air under pressure from the train pipe through ports 22, 32 and 20, and when a gradual reduction is made in train pipe pressure for a service application the triple valve moves back to service position, but the cavity 32 is arranged to open communication from the supplemental reservoir to the brake cylinder in advance of the opening of the service port from the auxiliary reservoir, so that the air from the supplemental reservoir flows into the brake cylinder slightly in advance of the air from the auxiliary reservoir, as before described. This additional supply of air to the brake cylinder at the beginning of the application serves to overcome the delay heretofore experienced in the initial filling of the brake cylinder with air, and to that extent hastens the action in service applications of the brakes.

The supplemental reservoir is made of the proper capacity to give the desired degree of pressure in the brake cylinder when the same is equalized therewith. With this feature of my improvement, only a small reduction in train pipe pressure is necessary to secure a moderate degree of brake cylinder pressure upon the first graduation, since the first movement of the main slide operates to deliver the charge of air from the supplemental reservoir to the brake cylinder, after which air is supplied from the auxiliary reservoir in the usual way. After the first graduation, the brake cylinder pressure may be increased by the further supply from the auxiliary reservoir in the ordinary manner, the check valve preventing any back flow from the brake cylinder to the supplemental reservoir.

With the construction as shown on Sheet 2, the brakes are released in the usual way upon an increase in train pipe pressure, the triple valve moving to release position, in which the exhaust cavity 31 in the main slide valve connects the brake cylinder 13 with the exhaust port 14.

With the preferred form of construction, as shown in Figs. 1 to 7 of the drawings, in which the graduating slide valve controls both the brake cylinder exhaust and the venting of the train pipe to the supplemental reservoir, it will be obvious that the supplemental reservoir may be used either merely for the purpose of graduating the release of the brakes or may also be utilized for the additional feature of supplying air to the brake cylinder for securing a more rapid initial rise in brake cylinder pressure in service applications of the brakes.

When the supplemental reservoir is to be used only for the purpose of providing a vent for the train pipe pressure in graduating the release, it will be apparent that the air from said supplemental reservoir instead of being equalized into the brake cylinder in service applications, may be released to the atmosphere, as shown in Fig. 8 of the drawings.

Having now described my invention, what I claim as new and desire to secure by Letters Patent is:—

1. In a fluid pressure brake, the combination with a train pipe, auxiliary reservoir and brake cylinder, of an additional reservoir or chamber, and means operated by an increase in train pipe pressure for venting air from the train pipe to said chamber.

2. In a fluid pressure brake, the combination with a train pipe, auxiliary reservoir and brake cylinder, of an additional reservoir or chamber, and valve mechanism operating at the time of releasing brakes for venting air from the train pipe to said chamber.

3. In a fluid pressure brake, the combination with a train pipe, auxiliary reservoir, triple valve, and brake cylinder, of an additional reservoir or chamber, and means operated by the movement of the triple valve in releasing brakes for venting air from the train pipe to said chamber.

4. In a fluid pressure brake, the combination with a train pipe, auxiliary reservoir, triple valve, and brake cylinder, of an additional reservoir or chamber, and means operated by the movement of the triple valve to release position for opening the brake cylinder exhaust and for venting air from the train pipe to said chamber.

5. In a fluid pressure brake, the combination of a valve mechanism operated by an increase in train pipe pressure for opening communication from the train pipe to a discharge passage, and a closed chamber communicating with said passage.

6. In a fluid pressure brake, the combination with a triple valve, and a chamber communicating with a train pipe discharge passage, of means for opening communication from the train pipe to said discharge passage when the triple valve moves to release position.

7. In a fluid pressure brake, the combination with a train pipe, auxiliary reservoir and brake cylinder, of an additional reservoir or chamber, and a triple valve device comprising a main valve having ports for releasing air from the brake cylinder and for venting air from the train pipe to said chamber in one position, and a graduating valve movable upon the main valve for controlling said ports.

8. In a fluid pressure brake, the combination with a train pipe, auxiliary reservoir, and brake cylinder, of an additional reservoir or chamber, and valve mechanism operated by an increase in train pipe pressure for venting air from the train pipe to said chamber, and by a reduction in train pipe pressure for releasing or reducing the pressure in said chamber.

9. In a fluid pressure brake, the combination with a train pipe, auxiliary reservoir, and brake cylinder, of an additional reservoir or chamber, and a triple valve device having a feed port for the auxiliary reservoir, and other ports for opening communication from the train pipe to said chamber in release position and for releasing air from said chamber in another position.

10. In a fluid pressure brake, the combination with a train pipe, auxiliary reservoir, and brake cylinder, of an additional reservoir separate from the auxiliary reservoir and a triple valve device having ports for opening communication from said additional reservoir to the brake cylinder in service applications.

11. In a fluid pressure brake, the combination with a train pipe, auxiliary reservoir, and brake cylinder, of an additional reservoir and valve mechanism operated by variations in train pipe pressure for venting air from the train pipe to said additional reservoir when the brakes are released and for opening communication from the additional reservoir to the brake cylinder when the brakes are applied.

12. In a fluid pressure brake, the combination with a train pipe, auxiliary reservoir, and brake cylinder, of an additional reservoir and a triple valve device having ports for venting air from the train pipe to said additional reservoir in release position, and for opening communication from the additional reservoir to the brake cylinder in service application position.

13. In a fluid pressure brake, the combination with a train pipe, auxiliary reservoir, and brake cylinder, of a supplemental reservoir separate from the auxiliary reservoir, and means operated by a gradual reduction in train pipe pressure for opening communication from the supplemental reservoir to the brake cylinder in advance of the opening of the supply port from the auxiliary reservoir to the brake cylinder.

14. In a fluid pressure brake, the combination with a train pipe, auxiliary reservoir, and brake cylinder, of a supplemental reservoir, a triple valve device having ports for opening communication from the supplemental reservoir to the brake cylinder in advance of the opening of the service port from the auxiliary reservoir to the brake cylinder, and a check valve for preventing return flow from the brake cylinder to the supplemental reservoir.

15. In a fluid pressure brake, the combination with a train pipe, auxiliary reservoir, and brake cylinder, of a supplemental reservoir, and a triple valve device comprising a main valve having ports for releasing air from the brake cylinder and for venting air from the train pipe to the supplemental reservoir in one position, a graduating valve for controlling said ports and having means for releasing the air from the supplemental reservoir when the train pipe vent port is closed.

16. In a fluid pressure brake, the combination with a train pipe, auxiliary reservoir, and brake cylinder, of an additional reservoir and a triple valve device having ports for supplying air from said additional reservoir to the brake cylinder in service applications.

17. In a fluid pressure brake, the combination with a train pipe, auxiliary reservoir and brake cylinder, of a supplemental reservoir and a triple valve device comprising a main valve having ports open to the train pipe and the supplemental reservoir in one position, and an auxiliary valve for controlling said ports.

In testimony whereof I have hereunto set my hand.

WATLER V. TURNER.

Witnesses:
R. F. EMERY,
J. B. MACDONALD.